United States Patent Office 3,304,490
Patented Feb. 14, 1967

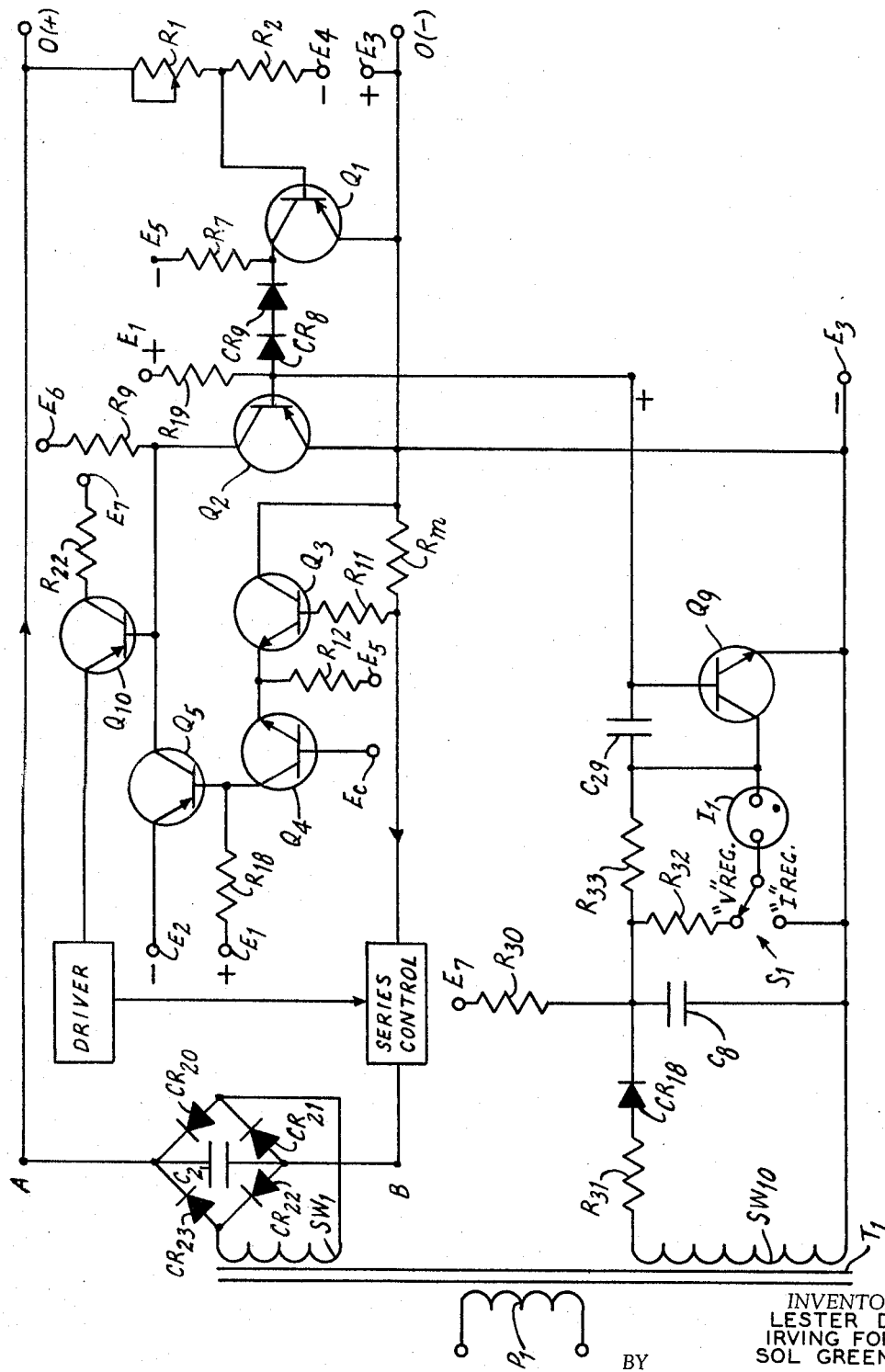

3,304,490
MONITORING CIRCUIT FOR REGULATED
POWER SUPPLY
Lester Dubin, Pelham Manor, Irving Forrest, Plainview, and Sol Greenberg, Port Washington, N.Y., assignors to Lambda Electronics Corporation, Long Island, N.Y., a body corporate of New York
Filed June 5, 1963, Ser. No. 285,715
8 Claims. (Cl. 323—9)

This invention relates to power supplies and more particularly to the monitoring of electrical conditions in such supplies.

In D.C. power supplies of the type that provide control over output voltage in one mode of operation and control over output current in another, it is sometimes desirable to monitor the operation of the supply to the end that the user may be apprised immediately of the particular mode in which supply is operated. While arrangements have been proposed for providing such monitoring, they are marked by relative complexity which adds to the basic cost of the supply and detracts from its reliability.

It is accordingly a general object of the invention to effect improvements in the monitoring of power supplies, particularly regulated D.C. power supplies. A more specific object of the invention is to effect greater simplicity and improved indication, in the monitoring circuit.

These and other objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

Serving to illustrate an exemplary embodiment of the invention is the sole figure illustrating the monitoring technique in a regulated D.C. supply.

As seen in the figure a typical supply in which the monitoring technique may be implemented comprises a series type regulator. Input power is applied to primary winding $P_1$ of the transformer $T_1$. Connected to a secondary winding $SW_1$ is a full wave rectifier bridge comprising rectifiers $CR_{20}$–$CR_{23}$, and filter $C_2$. The resulting unidirectional potential at A, B is applied to the load terminals $0(+)$ and $0(-)$ via output control means embodied as a series control circuit which may include a pass transistor or similar device.

The illustrated supply provides a constant voltage mode and a constant current mode. In the constant voltage mode variations in output voltage are sensed by a transistor error detector $Q_1$ connected to a divider across the output terminals which includes $R_1$, $R_2$ and a reference potential $E_4$–$E_3$. The emitter of $Q_1$ is connected to $E_3$ which is also the negative output terminal; the base is connected to the divider between $R_1$ and $R_2$. Any tendency for the output voltage to change thus causes an error signal which is applied to the input of $Q_1$. In response thereto the collector current of $Q_1$ varies thus varying the potential drop across $R_7$ which is connected between the collector of $Q_1$ and a collector supply terminal $E_5$. The potential across $R_7$ is coupled in turn to the input of a second stage $Q_2$. The base of this stage is connected to the collector of $Q_1$ via serially arranged diodes $CR_8$ and $CR_9$. The latter are normally conducting since they are connected via $R_{19}$ between a reference potential point $E_1$ and the relatively negative reference potential point $E_5$.

The error voltage applied to the base-emitter of $Q_2$ produces a related collector current in that stage which flows through a resistor $R_9$ connected between the collector and a potential source $E_6$. The potential across $R_9$ effects in turn the input bias of a further stage $Q_{10}$. The resultant output from the emiter of $Q_{10}$ serves to control a driver which controls in turn, the series control circuit. The system is arranged such that the impedance of the series control device varies in the presence of output voltage variations in such a manner as to offset these variations thus providing a substantially constant output voltage.

The current control mode is operative when load current exceeds a predetermined value. Load current is sensed in terms of the potential developed across resistor $R_m$ in series with the series control circuit and the negative output terminal. The voltage across $R_m$ is applied to a differential amplifier stage consisting of transistor stages $Q_3$ and $Q_4$.

Transistor $Q_3$ has its base-emitter circuit normally forward biased by way of the potential $E_3$–$E_5$ applied via $R_m$, $R_{11}$ and $R_{12}$. The bias source for stage $Q_4$ is applied by the adjustable potential $E_c$–$E_5$ which is less than $E_3$–$E_5$. During the constant voltage mode, the drop across $R_m$ is relatively small and $Q_3$ conducts while $Q_4$ is cut off because of the drop across common emitter resistor $R_{12}$. When the load current reaches a certain magnitude established by adjustable potential $E_c$–$E_5$, the potential drop across $R_m$ is sufficient to reduce conduction of $Q_3$ to the point where $Q_4$ also conducts. $Q_3$ and $Q_4$ now behave as a differential amplifier. The output of $Q_4$ is developed across $R_{18}$ and is thus applied to a stage $Q_5$ causing the collector current of the latter to increase. The output of $Q_5$ attains a magnitude under these conditions such that the resulting potential drop across $R_9$ which is in the collector circuit of $Q_5$ and $Q_2$, is effective to cut off $Q_2$, thus disabling the voltage sensing circuits. This results from the loop response to the rising potential across $R_9$ produced by $Q_5$ collector current. This rising potential reduces the drive to the series control circuit causing output potential to fall; conduction through $Q_1$ thus increases to the point where $Q_2$ cuts off. Control over the series control device is now accomplished by the above-described current control circuit, this control being exerted from $Q_3$, $Q_4$ through $Q_5$, $Q_{10}$ and the driver. The effect is to maintain load current at a substantially constant value when the predetermined value of load current is reached.

The load monitor includes a source of D.C. potential derived from the half-wave rectifier connected across secondary winding $SW_{10}$ and comprising $R_{31}$, $CR_{18}$ and $C_8$. In the voltage regulating mode this potential is applied to a series circuit comprising $R_{32}$ the V contact and arm of switch $S_1$, indicator $I_1$, preferably of gas discharge type, and the collector-emitter circuit of a transistor $Q_9$. The base of the latter is connected to the junction of $R_{19}$, $CR_8$ and the base of $Q_2$.

The emitter-base potential of $Q_9$ comprises the emitter-base potential of $Q_2$ and during normal constant voltage conditions is of sufficient magnitude to cutoff $Q_9$ whence indicator $I_1$ is extinguished. Should a fault occur, e.g. a condition of over current, which drives the system into the constant current mode, then $Q_2$ as noted above, will be switched off and back biased due to the drop across $CR_8$, $CR_9$ and $R_7$. In this case $Q_9$ is switched on thus energizing indicator $I_1$ to alert the user of the abnormal condition.

With switch $S_1$ in the I position during constant-current operation, it is seen that indicator $I_1$ and the collector-emitter of $Q_9$ are connected in shunt relationship and the combination energized via $R_{33}$ from the source developed across $C_8$. In the constant-current mode $Q_9$ is conducting as noted above, hence $I_1$ is effectively shorted and thus extinguished. A load fault, such as an open circuit, initiates the constant voltage mode whereupon $Q_2$ is forward biased, $Q_9$ cuts off and $I_1$ is energized. In this case too, then, the user is alerted to the condition. In addition to indicating faults, it may be seen that the action of $I_1$ alerts the user to human errors involving intent to operate in one mode while actually operating in the other. Thus if load conditions require the constant current mode but the user believes the constant voltage mode prevails, he will place $S_1$ in the constant V position and by the lighting of $I_1$, be appraised by the error.

It should be noted that $Q_2$ and $Q_9$ are opposite conductivity types. One, such as $Q_2$, is preferably a germanium transistor while the other may be silicon. Although other combinations may be adapted to perform the required functions, it has been found that this arrangement performs properly over a wide temperature range and exploits the threshold characteristics of $Q_9$ when the latter is silicon. Thus at a temperature $T_1$, about 0.2 volt (positive) appears across the emitter-base of $Q_2$ when it is conducting. This voltage cuts off $Q_9$. At a temperature $3T_1$, the emitter-base voltage of $Q_2$ during conduction is minus 0.05 volt; at this temperature $Q_9$ will still be cutoff. An analogous coaction characterizes the conditions prevailing over a wide temperature range when $Q_2$ is cutoff and $Q_9$ conductive.

The foregoing description is intended to be exemplary only. Modifications will naturally occur to those skilled in the art with respect to the monitor per se and to the particular supply with which it is used. The invention is not limited to the specific mechanisms shown and described but departures may be made therefrom within the scope of the accompanying claims without departing from the principles of the invention and without sacrificing its chief advantages.

What is claimed is:

1. A monitoring circuit for indicating the operating mode of a regulated D.C. power supply which includes a source of unregulated potential; output terminals; a variable control means coupling said source to said output terminals; a voltage control circuit operative in one mode of the power supply to adjust said control means to achieve a predetermined voltage characteristic at said output terminals; a current control circuit operative in the other mode of the power supply to adjust said control means to achieve a predetermined current characteristic at said output terminals; and circuit means interconnecting said current control circuit and said voltage control circuit to automatically select the mode which limits, respectively, the voltage and current at said output terminals in accordance with preselected settings; said monitoring circuit comprising a transistor so connected to said control circuits that said transistor is rendered conductive when the power supply is in one mode and is rendered nonconductive when the power supply is in the other mode; and an electrical indicating means connectable in series with said transistor to be energized when said transistor is conductive and to thereby indicate that the power supply is in one of said operating modes, and connectable in shunt relationship with said transistor to be energized when said transistor is nonconductive to thereby indicate that the power supply is in the other of said operating modes.

2. A monitoring circuit in accordance with claim 1 further comprising multiposition switch means and wherein said indicating means comprises a single lamp bulb connected in series with said transistor when said switch is in one position, and connected in shunt relation with said transistor when said switch is in another position.

3. A monitoring circuit in accordance with claim 2 indicating fault conditions wherein said switch cooperates with indicia visible to the operator indicating voltage regulation for one position and current regulation for the other and wherein said lamp bulb is energized when the power supply is operating in the mode opposite that indicated by the switch position.

4. A monitoring circuit for indicating the operating mode of a regulated D.C. power supply which includes a source of unregulated potential; output terminals; a series control means coupling said source to said output terminals; a transistor voltage control circuit operative in a constant voltage mode of the power supply to adjust said control means to achieve a constant voltage characteristic at said output terminals; a transistor control circuit operative in a constant current mode of the power supply to adjust said control means to achieve a constant current characteristic at said output terminals; and a common collector resistor connected to the output stage transistor in each of said control circuits, said series control means being adjusted in accordance with the potential developed across said common resistor to operate the power supply alternatively in the constant current and constant voltage modes; said monitoring circuit comprising a transistor so connected to said control circuits that said transistor is rendered conductive when the power supply is in one mode and is rendered nonconductive when the power supply is in the other mode; and an electrical indicating means connectable in series with said transistor to be energized when said transistor is conductive to thereby indicate that the power supply is in one of said operating modes, and connectable in shunt relationship with said transistor to be energized when said transistor is nonconductive to thereby indicate that the power supply is in the other of said operating modes.

5. A monitoring circuit in accordance with claim 4 wherein the potential applied to the base-emitter circuit of said transistor in said monitoring circuit is the same as the potential applied to the base-emitter circuit of said output stage transistor in said voltage control circuit.

6. A monitoring circuit in accordance with claim 5 wherein said transistor in said monitoring circuit and said output stage transistor in said voltage control circuit are of opposite conductivity types.

7. A monitoring circuit for indicating the operating mode of a regulated D.C. power supply which includes a source of unregulated potential; output terminals; a series control means coupling said source to said output terminals; a transistor voltage control circuit operative in a constant voltage mode of the power supply to adjust said control means to achieve a constant voltage characteristic at said output terminals; a transistor control circuit operative in a constant current mode of the power supply to adjust said control means to achieve a constant current characteristic at said output terminals; and a common collector resistor connected to the output stage transistor in each of said control circuits, said series control means being adjusted in accordance with the potential developed across said common resistor to operate the power supply alternatively in the constant current and constant voltage modes; said monitoring circuit comprising a transistor so connected to said control circuits that said transistor is rendered conductive when the power supply is operating in the constant current mode; a multi-position switch having two positions identified respectively for constant current and constant voltage operation; and indicating means connectable to said transistor via said switch so that said indicator is energized to indicate faults which occur when the power supply is operating in the mode opposite that indicated by the switch position.

8. A monitoring circuit in accordance with claim 7 wherein said indicating means includes a lamp bulb connected in series with said transistor when said switch is in the constant voltage position and connected in shunt relation to said transistor when said switch is in the constant current position.

References Cited by the Examiner

UNITED STATES PATENTS 2,590,973 4/1952 Jordan.
3,101,442 8/1963 Darbie et al.
3,210,749 10/1965 Magor.

FOREIGN PATENTS 951,318 3/1964 Great Britain.

JOHN F. COUCH, *Primary Examiner.*

A. D. PELLINEN, *Assistant Examiner.*